US010586037B1

(12) United States Patent
Krishnappa et al.

(10) Patent No.: US 10,586,037 B1
(45) Date of Patent: Mar. 10, 2020

(54) DISAMBIGUATION OF AN ALPHANUMERIC SECURITY CODE TO A USER

(71) Applicant: EMC IP Holding Company LLC, Hopkinton, MA (US)

(72) Inventors: Bharath Krishnappa, Karnataka (IN); Netravati V. Hegadi, Karnataka (IN); Daniel Hassan, Ra'anana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 150 days.

(21) Appl. No.: 15/197,898

(22) Filed: Jun. 30, 2016

(51) Int. Cl.
  *H04L 29/00* (2006.01)
  *G06F 21/46* (2013.01)
  *H04L 29/06* (2006.01)
  *H04W 12/06* (2009.01)

(52) U.S. Cl.
  CPC .......... *G06F 21/46* (2013.01); *H04L 63/0838* (2013.01); *H04W 12/06* (2013.01)

(58) Field of Classification Search
  CPC ......... G06F 21/45; H04L 9/08; H04L 63/083; H04L 9/3226
  See application file for complete search history.

(56) References Cited

U.S. PATENT DOCUMENTS

| | | | |
|---|---|---|---|
| 7,702,911 B2 * | 4/2010 | Fiske | G06F 21/46 380/44 |
| 7,848,746 B2 | 12/2010 | Juels | |
| 7,849,323 B2 | 12/2010 | Field et al. | |
| 7,886,345 B2 | 2/2011 | Kaliski et al. | |
| 7,921,311 B2 | 4/2011 | Ciaffi et al. | |
| 8,046,596 B2 | 10/2011 | Ciaffi et al. | |
| 8,413,221 B2 | 4/2013 | Kaliski, Jr. et al. | |
| 8,438,617 B2 | 5/2013 | Brainard et al. | |
| 8,495,372 B2 | 7/2013 | Bailey et al. | |
| 9,071,439 B2 | 6/2015 | Nystrom et al. | |
| 9,137,012 B2 | 9/2015 | Bailey et al. | |
| 9,256,725 B2 | 2/2016 | Oprea et al. | |
| 9,536,069 B1 * | 1/2017 | Shah | G06F 21/31 |
| 9,594,888 B1 | 3/2017 | Vipond | |
| 9,674,177 B1 | 6/2017 | Nystrom | |
| 2010/0043079 A1 * | 2/2010 | Barre | G06F 21/36 726/28 |
| 2010/0107229 A1 * | 4/2010 | Najafi | G06F 21/35 726/6 |
| 2015/0319159 A1 * | 11/2015 | Abdul Hameed Khan | H04L 67/20 726/7 |

* cited by examiner

*Primary Examiner* — Jeffrey C Pwu
*Assistant Examiner* — Helai Salehi
(74) *Attorney, Agent, or Firm* — BainwoodHuang

(57) ABSTRACT

A technique communicates a password to a user. The technique involves receiving, by processing circuitry, a request for a password. The technique further involves generating, by the processing circuitry, a password in response to the request. The password includes a series of alphanumeric digits which contains at least one number and at least one letter. The technique further involves displaying, by the processing circuitry, the password on a display screen. Each number displayed on the display screen has a first visual characteristic, and each letter displayed on the display screen has a visual characteristic that is different from the first visual characteristic. Such a technique enables disambiguation of an alphanumeric security code to a user.

23 Claims, 6 Drawing Sheets

DISAMBIGUATION OF AN ALPHANUMERIC SECURITY CODE TO A USER

BACKGROUND

A conventional authentication token outputs a one-time use passcode (OTP) to a computer user. The computer user then reads the OTP from the authentication token and types the OTP into a computer to prove that the computer user is in possession of the authentication token.

If the typed OTP matches an expected OTP, authentication is successful and the computer user is considered authentic. However, if the typed OTP does not match the expected OTP, authentication is considered unsuccessful (e.g., because the computer user may be a fraudster).

SUMMARY

It should be understood that there may be deficiencies to the above-described conventional authentication token which simply outputs a OTP to a computer user. Along these lines, suppose that the authentication token outputs, as the OTP, a sequence of numbers and letters. Unfortunately, many numbers are very similar in appearance to certain letters. For example, the number "0" (zero) can be easily confused with an uppercase "O". As another example, the number "1" can be easily confused with an uppercase "I" or a lowercase "L", and so on.

Forcing the computer user to make a guess when reading the OTP may not only be burdensome and frustrating, the outcome may cause trouble for the computer user as well. For example, if the legitimate computer user makes a mistake when reading and typing the OTP, the computer user will not successfully authenticate and may need to re-authenticate. Moreover, if the legitimate computer user fails authentication multiple times in a row during a short time period, the legitimate computer user may become locked out and then need to go through an extra process to undo the lockout (e.g., invoke assistance from a system administrator).

Alternatively, suppose that the authentication token outputs, as the OTP, only numbers. Unfortunately, the security strength of the OTP is much weaker since there are less possible choices for each digit.

In contrast to the above-described conventional authentication token situations in which it is difficult to discern certain numbers and letters from each other or in which the OTP uses only numbers and thus provides weaker security, improved techniques are directed to visually assisting a human user by displaying numbers and letters using different visual characteristics. In one arrangement, the colors are different between numbers, lowercase letters, and uppercase letters. In another arrangement, the typeset is different between numbers and letters. In yet another arrangement, numbers are underlined and letters are not underlined, and so on. Such use of different visual characteristics for numbers and letters enables human users to more easily read a password correctly. Accordingly, authentic users are more likely authenticate successfully. As a result, such users have more satisfying experiences and the possibility of inadvertently causing a lockout event by typing in the wrong password is minimized.

One embodiment is directed to a method of communicating a password to a user. The method includes receiving, by processing circuitry, a request for a password. The method further includes generating, by the processing circuitry, a password in response to the request. The password includes a series of alphanumeric digits which contains at least one number and at least one letter. The method further includes displaying, by the processing circuitry, the password on a display screen. Each number displayed on the display screen has a first visual characteristic, and each letter displayed on the display screen has a visual characteristic that is different from the first visual characteristic. Such an improvement enables disambiguation of an alphanumeric security code to a user. In some arrangements, displaying the password on the display screen includes outputting each number in a first typeset and each letter in a typeset that is different from the first typeset. Accordingly, the different typesets enable the user to easily discern numbers from letters.

In some arrangements, the series of alphanumeric digits includes at least one number, at least one lowercase letter, and at least one uppercase letter. In these arrangements, outputting includes rendering each number in the first typeset, rendering each lowercase letter in a second typeset, and rendering each uppercase letter in a third typeset. Here, the first typeset, the second typeset, and the third typeset are different from each other. Accordingly, the user is able to easily distinguish numbers, lowercase letters, and uppercase letters from each other (e.g., the uppercase "I", the lowercase "L", and the number "1" are clearly different from each other).

In some arrangements, displaying the password on the display screen includes outputting each number in a first color and each letter in a color that is different from the first color. Here, the different colors enable the user to easily discern numbers from letters.

In some arrangements, the series of alphanumeric digits includes at least one number, at least one lowercase letter, and at least one uppercase letter. In these arrangements, outputting includes rendering each number in the first color (e.g., grey), each lowercase letter in a second color (e.g., blue), and each uppercase letter in a third color (e.g., red). Here, the first color, the second color, and the third color are different from each other.

In some arrangements, generating the password choosing at least six alphanumeric digits (e.g., six digits, seven digits, eight digits, 10 digits, and so on). Each alphanumeric digit is chosen from a predefined group of alphanumeric digits that includes at least 70 digits (e.g., 10 numbers, 26 lowercase letters, 26 uppercase letters, etc.).

In some arrangements, rendering includes presenting the series of alphanumeric digits on an electronic display of a mobile device. In particular arrangements, the mobile device is a smart phone, and the electronic display is a touchscreen of the smart phone. In some arrangements, receiving the request for the password includes detecting a button press event in response to a user gesture entered on the touchscreen. For example, the user may press a button object to request a OTP. As another example, the user may press a button object while initially authenticating on the smart phone (i.e., after detecting the button press event in response to the user gesture entered on the touchscreen, the smart phone performs an authentication operation to authenticate the user and the password is generated in response to successful authentication of the user).

In some arrangements, the method further includes, while the password is displayed on the display screen, displaying a legend adjacent to the password. For example, in the context of using different colors, the legend indicates that the numbers are rendered in the first color, lowercase letters are rendered in the second color, and uppercase letters are rendered in the third color.

Another embodiment is directed to an electronic apparatus which includes a display screen, memory, and control circuitry coupled to the display screen and the memory. The memory stores instructions which, when carried out by the control circuitry, cause the control circuitry to:

(A) receive a request for a password,
(B) generate a password in response to the request, the password including a series of alphanumeric digits which contains at least one number and at least one letter, and
(C) display the password on the display screen.

Each number displayed on the display screen has a first visual characteristic, and each letter displayed on the display screen has a visual characteristic that is different from the first visual characteristic.

Yet another embodiment is directed to a computer program product having a non-transitory computer readable medium which stores a set of instructions to convey a password to a user. The set of instructions, when carried out by computerized circuitry, causing the computerized circuitry to perform a method of:

(A) receiving a request for a password;
(B) generating a password in response to the request, the password including a series of alphanumeric digits which contains at least one number and at least one letter; and
(C) displaying the password on a display screen.

Each number displayed on the display screen has a first visual characteristic, and each letter displayed on the display screen has a visual characteristic that is different from the first visual characteristic.

It should be understood that, in the cloud context, at least some of the electronic circuitry (e.g., an authentication server) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in disambiguating alphanumeric security codes to users.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to disambiguating an alphanumeric security code to a user. The technique involves visually assisting the user by displaying numbers and letters using different visual characteristics. In one arrangement, the colors are different between numbers, lowercase letters, and uppercase letters. In another arrangement, the typeset is different between numbers and letters. Other visual characteristics are suitable for use as well such as highlighting, underlining, blinking, outlining, and so on. Such use of different visual characteristics for numbers and letters enables users to more easily read a password correctly. Accordingly, authentic users are more likely authenticate successfully. As a result, such users have more satisfying experiences and the possibility of inadvertently causing a lockout event by typing in the wrong password is minimized.

Figure 1:
FIG. 1 is a block diagram of an electronic environment which utilizes disambiguation of alphanumeric security codes to users.

FIG. 1 is a block diagram of an electronic environment 20 which utilizes disambiguation of alphanumeric security codes to human users 22. The electronic environment 20 includes electronic apparatus 24(1), 24(2), . . . (collectively, electronic apparatus 24), client devices 26(1), 26(2), . . . (collectively, client devices 26), a remote authentication server 28, a set of remote servers 30 that control access to protected resources, and a communications medium 32.

Each human user 22 possesses a respective electronic apparatus 24 and a respective client device 26. Along these lines, the user 22(1) possesses an electronic apparatus 24(1) and a client device 26(1). Likewise, the user 22(2) possesses an electronic apparatus 24(2) and a client device 26(2), and so on.

Each electronic apparatus 24 is constructed and arranged to store a secret on behalf of a particular human user 22 and, based on that secret, routinely derive a new alphanumeric security code for use by that particular user 22 during authentication. In some arrangements, the alphanumeric security codes (hereinafter referred to as passwords) are one-time use passcodes (OTPs). Suitable form factors for an electronic apparatus 24 include mobile devices running soft token applications such as smart phones, tablets, personal digit assistants (PDAs), electronic smart cards, and the like which are equipped with graphical displays.

Each client device 26 is constructed and arranged to access to a set of resources on behalf of a respective user 22 so that the user 22 is able to perform useful work. Along these lines, the client device 26(1) accesses resources for the user 22(1), the client device 26(2) accesses resources for the user 30(2), and so on. It should be understood that user authentication to unlock access to the set of resources may performed completely locally (i.e., entirely within a client device 26), or involve the remote authentication server 28 (i.e., where at least a portion of the authentication process involves the remote authentication server 28). Some protected resources that are accessed may be local (e.g., login access to a client device 26, data locally stored in a client device 26, etc.). Other protected resources that are accessed may be remote (e.g., login access to a remote server 30, data remotely stored in a remote server 30, etc.). Suitable form factors for a client device 26 include a desktop computer, a workstation, a tablet, a laptop computer, specialized equipment, etc.

The remote authentication server 28 is constructed and arranged to remotely authenticate users 22 of the client devices 26. In particular, the remote authentication server 28 compares passwords entered by the users 22 into the client devices 26 with expected passwords for the users 22 to determine whether the users 22 are authentic. Along these lines, the remote authentication server 28 understands the secrets that are deployed on the electronic apparatus 24 and are thus able to independently derive the expected passwords for the users 22 for comparison with the passwords entered by the users 22.

The remote servers 30 represent external electronic equipment which may communicate with the client devices 26 and/or the remote authentication server 28. Each remote server 30 is capable of providing, to a user 22, access to one or more remote protected resources. Example remote servers 30 include password managers/vaults, single sign-on servers, enterprise servers, VPN servers, file servers, database servers, email servers, web servers, content servers, game servers, online stores, banking servers, and so on.

The communications medium 32 is constructed and arranged to connect the various components of the electronic environment 20 together to enable these components to exchange electronic signals 40 (e.g., see the double arrow 40). At least a portion of the communications medium 32 is illustrated as a cloud to indicate that the communications medium 32 is capable of having a variety of different topologies including backbone, hub-and-spoke, loop, irregular, combinations thereof, and so on. Along these lines, the communications medium 32 may include copper-based data communications devices and cabling, fiber optic devices and cabling, wireless devices, combinations thereof, etc. Furthermore, the communications medium 32 is capable of supporting LAN-based communications, SAN-based communications, cellular communications, combinations thereof, etc.

During operation, the users 22 authenticate in order to access resources using their client devices 26. In particular, a user 22 reads a password from the electronic apparatus 24 assigned to and possessed by that user 22, and enters the password into a client device 26. If authentication is performed locally, the client device 26 compares the entered password with an expected password to determine whether the user 22 is genuine (or an unauthorized person attempting to overcome the security of the client device 26). If authentication is performed remotely, the remote authentication server 28 receives the entered password from the client device 26 and compares the entered password with an expected password to determine whether the user 22 is authentic.

If the entered password matches the expected password, authentication is considered successful (i.e., the user 22 is deemed to be authentic) and the user 22 is granted resource access. However, if the entered password does not match the expected password, authentication is considered unsuccessful and the user 22 is denied resource access.

It should be understood that, to facilitate each user's ability to properly read and entered passwords correctly, the electronic apparatus 22 are constructed and arranged to disambiguate password digits based on whether the digits are numbers or letters (i.e., to clearly distinguish the numbers from the letters of the passwords). In particular, each number of the password is displayed by the electronic apparatus 22 using a particular visual characteristic (e.g., a particular color, a particular typeset, a particular highlighting, etc.) to indicate that it is a number and not a letter.

Similarly, letters are displayed using a different visual characteristic. In some arrangements, uppercase letters and lowercase letters are displayed using different visual characteristics to distinguish upper case letters from lowercase letters (e.g., so an uppercase "I" is not confused with a lowercase "L", etc.). Further details will now be provided with reference to FIG. 2.

Figure 2:
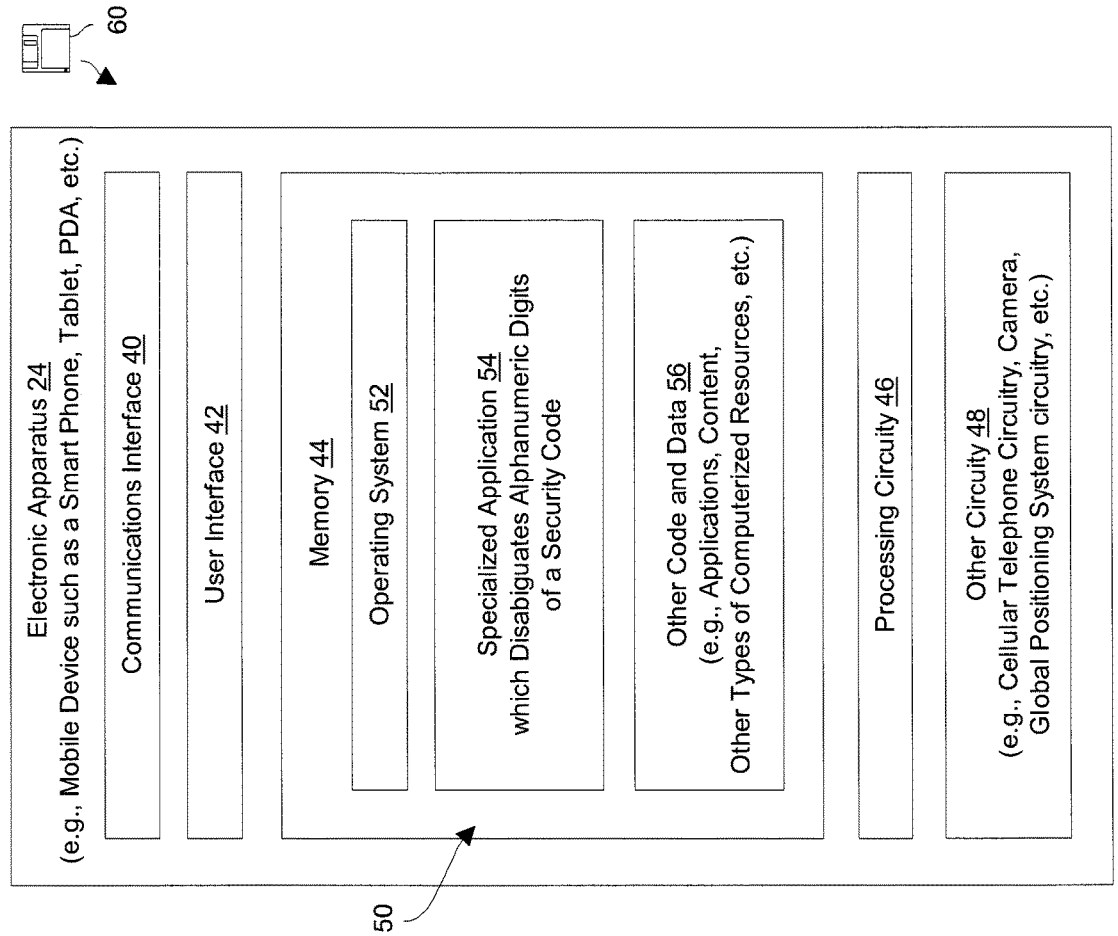
FIG. 2 is a block diagram of an electronic apparatus of the electronic environment of FIG. 1.

FIG. 2 shows particular details of an electronic apparatus 22 of the electronic environment 20. The electronic apparatus 22 takes the form of a mobile device (e.g., a smart phone, a tablet, etc.) which includes a communications interface 40, a user interface 42, memory 44, processing circuitry 46, and other circuitry 48.

The communications interface 40 is constructed and arranged to connect the electronic apparatus 22 to the communications medium 32 (also see FIG. 1). Accordingly, the communications interface 40 enables the electronic apparatus 22 to communicate with the other components of the electronic environment 20. Such communications may be wireless or even cable-based (i.e., IP-based, SAN-based, cellular, Bluetooth, combinations thereof, and so on).

The user interface 42 is constructed and arranged to receive input from a user 30 and provide output to the user 30. In some arrangements, the user interface 74 is formed by one or more specialized components such as a touchscreen which provides graphical information and which is configured to sense user gestures.

The memory 44 is intended to represent both volatile storage (e.g., DRAM, SRAM, etc.) and non-volatile storage (e.g., read-only memory, flash memory, etc.). The memory 44 stores a variety of software constructs 50 including an operating system 52, a specialized application 54 which disambiguates alphanumeric digits of a security code, and other code/data 56.

The processing circuitry 48 is constructed and arranged to operate in accordance with the various software constructs 50 stored in the memory 44. In particular, the processing circuitry 48, when executing the operating system 52, manages various parts of the electronic apparatus 22 (e.g., memory allocation, processor cycles, etc.). Additionally, the processing circuitry 48, when executing the specialized application 54, forms specialized circuitry which clearly communicate passwords to the authentic user 22 possessing the electronic apparatus 22. Furthermore, the other code and data 56 represents other types of information such as other applications (or apps), content, other types of computerized resources, combinations thereof, etc.

It should be understood that the above-mentioned specialized circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 60 is capable of delivering all or portions of the software to the electronic apparatus 22. The computer program product 60 has a non-transitory and non-volatile computer readable medium which stores a set of instructions to control one or more operations of the electronic apparatus 22. Examples of suitable computer readable storage media include tangible articles of manufacture and apparatus which store instructions in a non-volatile manner such as CD-ROM, flash memory, disk memory, tape memory, and the like.

The other circuitry 48 represents additional specialized componentry of the electronic apparatus 22. Examples of such componentry include cellular telephony circuitry to make cellular phone calls, camera circuitry to take pictures and/or record movies, global positioning system (GPS)

circuitry, and other circuitry which is typical of a portable apparatus. Further details will now be provided with reference to FIGS. 3 through 5.

Figure 3:
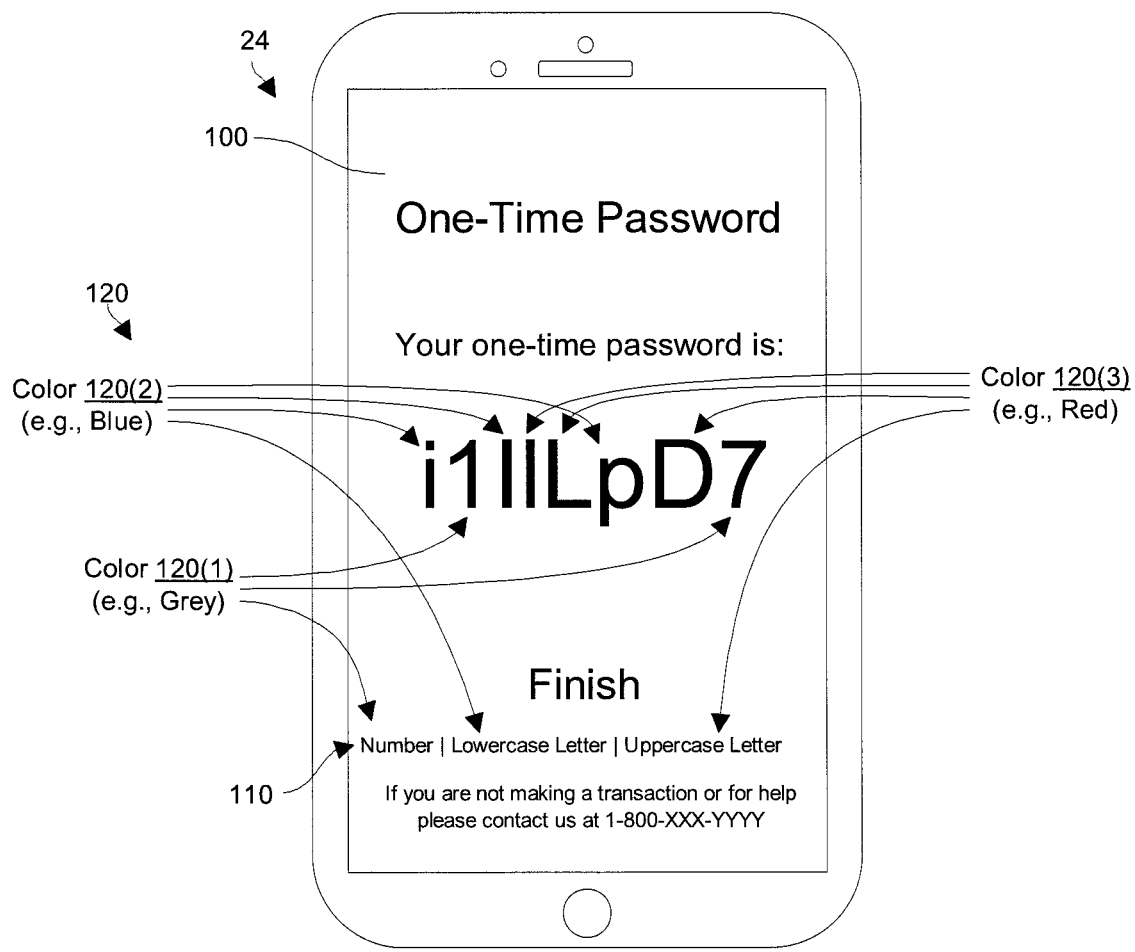
FIG. 3 is a diagram illustrating a first disambiguation example.
Figure 4:
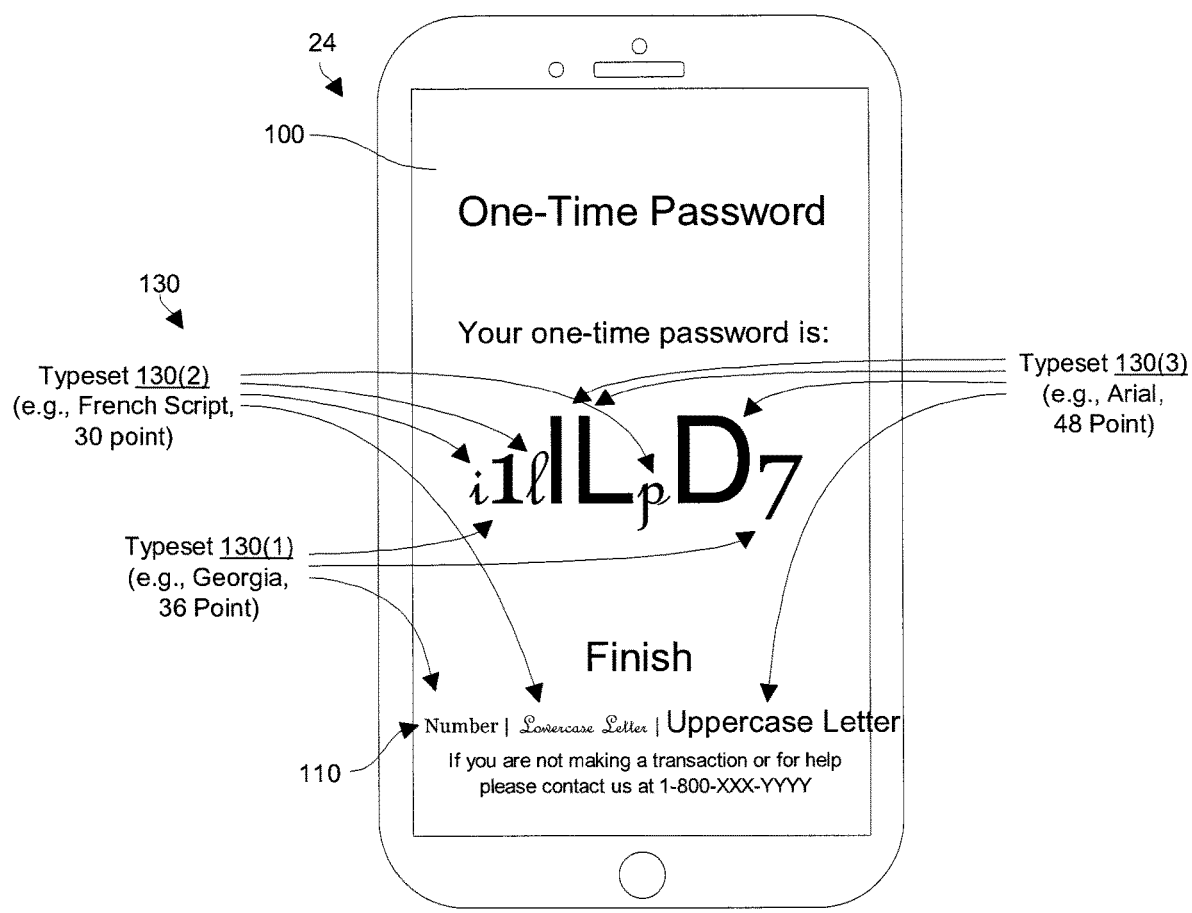
FIG. 4 is a diagram illustrating a second disambiguation example.
Figure 5:
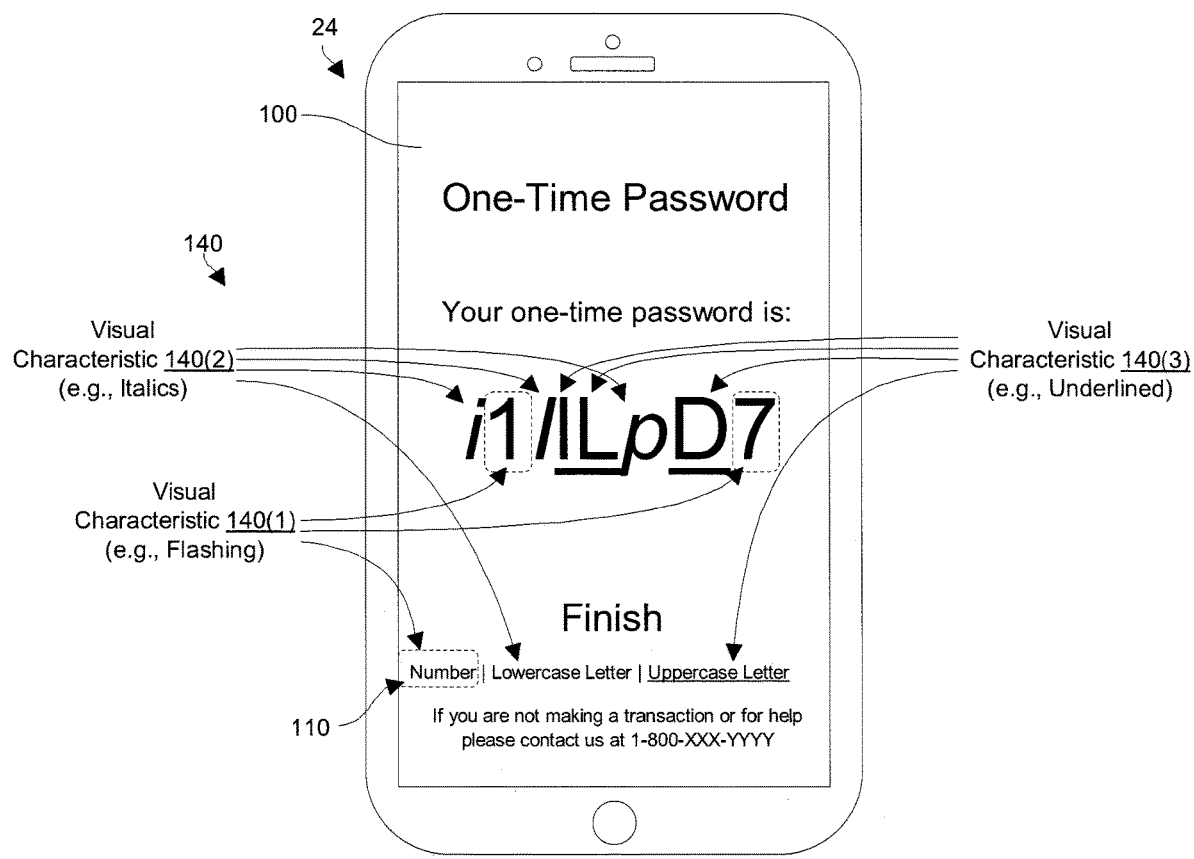
FIG. 5 is a diagram illustrating a third disambiguation example.

FIGS. 3 through 5 show different examples of how the electronic apparatus 24 are able to disambiguate alphanumeric digits of a password. By way of example only, the electronic apparatus 24 is in the form of a smart phone which has a touchscreen 100. FIG. 3 shows an example which uses different colors to disambiguate numbers, lowercase letters, and uppercase letters of a password. FIG. 4 shows an example which uses different typesets to disambiguate numbers, lowercase letters, and uppercase letters of a password. FIG. 5 shows an example which uses a combination of visual characteristics (i.e., different colors and underlining) to disambiguate numbers, lowercase letters, and uppercase letters of a password.

With reference to FIGS. 3 through 5, suppose that the electronic apparatus 24 for a particular user 22 outputs "i1lILpD7" as the current password for the user 22. That is, the current password includes a series of eight alphanumeric digits. The first digit of the password is a lowercase "I" (or "i"). The second digit is the number "1". The third digit is a lowercase "L" (or "l"). The fourth digit is an upper case "I". The fifth digit is an upper case "L". The sixth digit is a lowercase "P" (or "p"). The seventh digit is an uppercase "D". The eighth digit is the number "7".

In connection with FIGS. 3 through 5, if each alphanumeric digit is output using the same visual characteristics (e.g., the same color, the typeset, etc.), it may be difficult for the user 22 to read the password correctly. For example, it may be difficult for the user 22 to realize that the second digit of the password is the number "1". Rather, the user 22 may incorrectly think that the second digit of the password is a lowercase "L".

Similarly, it may be difficult for the user 22 to realize that the third digit of the password is a lowercase "L". Rather, the user 22 may incorrectly think that the third digit of the password is the number "1" or an uppercase "I".

Likewise, it may be difficult for the user 22 to realize that the fourth digit of the password is an uppercase "I". Rather, the user 22 may incorrectly think that the fourth digit is the number "1" or a lowercase "L", and so on.

Other alphanumeric similarities exist that may confuse the user 22 such as the number "2" and an uppercase or lowercase "Z", the number "5" and an uppercase or lowercase "S", the number "6" and a lowercase "b", the number "0" and an uppercase or lowercase "O", an uppercase "C" and a lowercase "C" (or "c"), an uppercase "K" and a lowercase "K" (or "k"), and so on. There is a higher likelihood of the user inadvertently reading an alphanumeric digit incorrectly without somehow assisting the user 22.

Advantageously, the electronic apparatus 24 assists the user 22 by providing the various alphanumeric digits of the password with different visual characteristics and a legend 110 that tells the user 22 whether each alphanumeric digit of the password is a number, an uppercase letter, or a lowercase letter.

As shown in the example of FIG. 3, the electronic apparatus 24 uses different colors 120(1), 120(2), 120(3) as the visual characteristics that assist the user 22. In particular, each number of the password is displayed in the color 120(1) (e.g., grey) and the word "Number" in the legend 110 is also in the color 120(1) (e.g., grey). Accordingly, the user 22 easily understands that the second and eighth digits of the password are numbers.

Additionally, each lowercase letter of the password is displayed in the color 120(2) (e.g., blue) and the words "Lowercase Letter" in the legend 110 are also in the color 120(2) (e.g., blue). Accordingly, the user 22 easily understands that the first, third and sixth digits of the password are lowercase letters.

Furthermore, each uppercase letter of the password is displayed in the color 120(3) (e.g., red) and the words "Uppercase Letter" in the legend 110 are also in the color 120(3) (e.g., red). Accordingly, the user 22 easily understands that the fourth, fifth and seventh digits of the password are uppercase letters.

Since the user 22 is able to properly read the password, the user is more likely to correctly enter the password into the user's client device 26 (also see FIG. 1). Accordingly, the legitimate user 22 is more likely to successfully authenticate on the first try, and less burdened by unsuccessful authentication attempts due to incorrect password reading. Moreover, the legitimate user 22 is less likely to inadvertently experience a lockout situation due to multiple unsuccessful authentication attempts in a row within a short period of time.

As a second example, the electronic apparatus 24 uses different typesets 130(1), 130(2), 130(3) as the visual characteristics that assist the user 22. Examples of using different typesets include using different fonts, using different point sizes, using different digit heights/widths/etc., combinations thereof, and so on. As shown in the example of FIG. 4, each number of the password is displayed in a first typeset 130(1) (e.g., Georgia font, 36 point) and the word "Number" in the legend 110 is also in the first typeset 130(1). Accordingly, the user 22 easily understands that the second and eighth digits of the password are numbers.

Additionally, each lowercase letter of the password is displayed in a second typeset 130(2) (e.g., French Script, 30 Point) and the words "Lowercase Letter" in the legend 110 are also in the second typeset 130(2). Accordingly, the user 22 easily understands that the first, third and sixth digits of the password are lowercase letters.

Furthermore, each uppercase letter of the password is displayed in a third typeset 130(3) (e.g., Arial, 48 Point) and the words "Uppercase Letter" in the legend 110 are also in the third typeset 130(3). Accordingly, the user 22 easily understands that the fourth, fifth and seventh digits of the password are uppercase letters.

Again, the user 22 is able to properly read the password since each alphanumeric digit is in a particular typeset combination which is distinguishable from the others. As a result, the user is more likely to correctly enter the password into the user's client device 26 (also see FIG. 1).

As a third example, the electronic apparatus 24 uses different visual characteristics 140(1), 140(2), 140(3) other than colors and typesets. In particular, as shown in the example of FIG. 5, each number of the password is displayed in a flashing (or blinking) manner and the word "Number" in the legend 110 is also displayed in a flashing (or blinking), i.e., a first visual characteristic 140(1). Accordingly, the user 22 easily understands that the second and eighth digits of the password are numbers. Additionally, each lowercase letter of the password is displayed in italic form and the words "Lowercase Letter" in the legend 110 are also in italic form, i.e., a second visual characteristic 140(2). Accordingly, the user 22 easily understands that the first, third and sixth digits of the password are lowercase letters.

Furthermore, each uppercase letter of the password is displayed in underlined form and the words "Uppercase Letter" in the legend 110 are also displayed in underlined form, i.e., a third visual characteristic 140(3). Accordingly, the user 22 easily understands that the fourth, fifth and seventh digits of the password are uppercase letters.

Again, the user 22 is able to properly read the password since each alphanumeric digit is displayed with a different visual characteristic 140(1), 140(2), 140(3) which is distinguishable from the others. As a result, the user is more likely to correctly enter the password into the user's client device 26 (also see FIG. 1).

It should be understood that other visual characteristics are suitable for use as well. Other examples include displaying some digits in hollow outlined form, some digits multiple colors, some digits filled with certain patterns (e.g., diagonal lines, vertical lines, checkered, spotted, etc.), some digits demarcated with symbols (e.g., an adjacent arrow, an overhead dot, etc.), and so on. Further details will now be provided with reference to FIG. 6.

Figure 6:
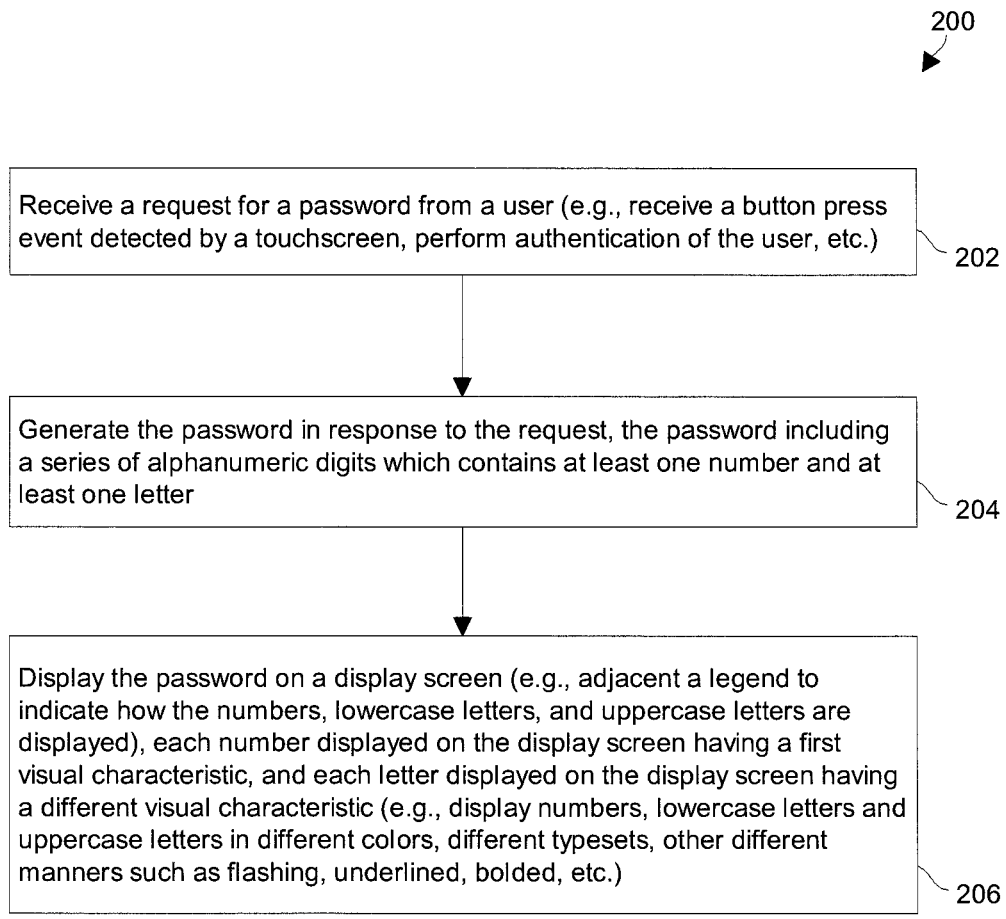
FIG. 6 is a flowchart of a procedure which is performed by the electronic apparatus of FIG. 2.

FIG. 6 is a flowchart of a procedure 200 which is performed by the electronic apparatus 24 when communicating a password to a user. In particular, as mentioned earlier, the electronic apparatus 24 disambiguates alphanumeric digits of the password.

At 202, the electronic apparatus 24 receives a request for a password from a user. In some arrangements, the user simply presses a button on the electronic apparatus 24 and the button operates as a command to provide the password (e.g., a touchscreen of the electronic apparatus 24 detects a user gesture that commands the electronic apparatus 24 to output the password). In other arrangements, the password is provided only in response to successful authentication of the user by the electronic apparatus 24 (e.g., the user provides a set of authentication factors such as a personal identification number and/or a biometric to the electronic apparatus 24 and the electronic apparatus 24 authenticates the user).

At 204, the electronic apparatus 24 generates the password in response to the request. The password includes a series of alphanumeric digits which contains at least one number and at least one letter. In some arrangements, the password is at least six digits in length (e.g., six, seven, eight, etc.).

At 206, the electronic apparatus 24 displays the password on a display screen. Each number displayed on the display screen has a first visual characteristic (e.g., a particular color, a particular typeset, etc.), and each letter displayed on the display screen having a visual characteristic that is different from the first visual characteristic (e.g., a different color, a different typeset, etc.). Other suitable visual characteristics that enable the user to distinguish numbers, lowercase letters, uppercase letters, etc. include bolding, underlining, italic form, flashing/blinking, and so on.

Moreover, in some arrangements, the electronic apparatus 24 further displays a legend (or map key) that explains how the numbers, lowercase letters, and uppercase letters are represented/displayed. Accordingly, the user is able to simply match the visual characteristic of an alphanumeric digit to a key in the legend to understand whether that alphanumeric digit is a number, a lowercase letter or an uppercase letter.

One should appreciate that electronic apparatus 24 performs particular complex operations to disambiguate the alphanumeric digits of the password. In particular, the specialized circuitry of the electronic apparatus 24 (e.g., the processing circuitry 46 operating in accordance with the specialized application 54, also see FIG. 2) parses the password in individual alphanumeric digits. The specialized circuitry then selects a particular visual characteristic (e.g., color, font, point size, etc.) for each digit depending on whether that digit is a number, a lowercase letter, or an uppercase letter. The specialized circuitry then displays that digit in proper sequence within the password using the selected visual characteristic for that digit.

As described above, improved techniques are directed to visually assisting a human user 22 by displaying numbers and letters using different visual characteristics 120, 130, 140. In one arrangement, the colors are different between numbers, lowercase letters, and uppercase letters. In another arrangement, the typeset is different between numbers and letters. In yet another arrangement, numbers are underlined and letters are not underlined, and so on. Such use of different visual characteristics 120, 130, 140 for numbers and letters enables users 22 to more easily read a password correctly. Accordingly, authentic users 22 are more likely authenticate successfully. As a result, such users 22 have more satisfying experiences and the possibility of inadvertently causing a lockout event by typing in the wrong password is minimized.

One should appreciate that the above-described techniques do not merely output passwords. Rather, the disclosed techniques involves improving the technology. In particular, with the techniques, other advantages are available as well such as higher user accuracy, less likelihood of accidental lockouts, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the servers are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of displaying a security code on an electronic apparatus, the method comprising:
  receiving, by control circuitry of the electronic apparatus, a request for a security code;
  automatically generating, by the control circuitry, a security code in response to the request, the security code including a series of alphanumeric digits which contains at least one number and at least one letter, wherein generating the security code includes automatically choosing, by the control circuitry without user input subsequent to receipt of the request for the security code, at least six alphanumeric digits from a predefined group of alphanumeric digits;

displaying, automatically by the control circuitry on a display screen of the electronic apparatus, in response to and after automatic generation of the security code by the control circuitry, and without user input subsequent to receipt of the request for the security code, the security code, wherein the series of alphanumeric digits in the security code is automatically displayed by the control circuitry using a combination of different visual characteristics automatically selected by the control circuitry to visually distinguish numbers of the security code from letters of the security code, each number being displayed on the display screen using a first visual characteristic that is automatically selected by the control circuitry, and each letter being displayed on the display screen using, instead of the first visual characteristic, at least one visual characteristic that is different from the first visual characteristic and that is also automatically selected by the control circuitry, and wherein automatically displaying the security code by the control circuitry in response to and after automatic generation of the security code by the control circuitry and without user input subsequent to receipt of the request for the security code further comprises i) automatically parsing the previously generated security code by the control circuitry with regard to each individual alphanumeric digit in the security code, and ii) automatically selecting, by the control circuitry after parsing of the previously generated security code by the control circuitry, the first visual characteristic for each individual number in the security code and the at least one visual characteristic that is different from the first visual characteristic for each individual letter in the security code; and while the security code is displayed on the display screen, simultaneously displaying a legend adjacent to the security code, the legend visually indicating that the individual numbers of the security code are displayed using the first visual characteristic and that the individual letters of the security code are displayed using the at least one visual characteristic that is different from the first visual characteristic.

2. A method as in claim 1 wherein displaying the security code on the display screen includes:
outputting each number in a first typeset and each letter in a typeset that is different from the first typeset.

3. A method as in claim 1 wherein displaying the security code on the display screen includes:
outputting each number in a first color and each letter in a color that is different from the first color.

4. A method as in claim 1, wherein the control circuitry of the electronic apparatus automatically generates the security code at least in part by deriving the security code based on a secret stored in the electronic apparatus on behalf of the user of the electronic apparatus.

5. A method as in claim 1, further comprising:
wherein the electronic apparatus comprises a mobile device;
wherein the rendering includes presenting the series of alphanumeric digits on an electronic display of the mobile device; and wherein receiving the request for the security code includes detecting a button press event in response to a user gesture entered on a touchscreen of the mobile device.

6. A method as in claim 2 wherein the series of alphanumeric digits includes at least one number, at least one lowercase letter, and at least one uppercase letter;
wherein outputting includes:
rendering each number in the first typeset,
rendering each lowercase letter in a second typeset, and
rendering each uppercase letter in a third typeset; and
wherein the first typeset, the second typeset, and the third typeset are different from each other.

7. A method as in claim 3 wherein the series of alphanumeric digits includes at least one number, at least one lowercase letter, and at least one uppercase letter;
wherein outputting includes rendering each number in the first color, each lowercase letter in a second color, and each uppercase letter in a third color; and
wherein the first color, the second color, and the third color are different from each other.

8. A method as in claim 7 wherein one color of the first color, the second color, and the third color is grey,
wherein another color of the first color, the second color, and the third color is blue, and
wherein a last color of the first color, the second color, and the third color is red.

9. A method as in claim 7, further comprising:
wherein the legend further indicates that the numbers are rendered in the first color, lowercase letters are rendered in the second color, and uppercase letters are rendered in the third color.

10. A method as in claim 7 wherein rendering includes:
parsing the series of alphanumeric digits into separate symbols,
displaying each symbol that is a number in the color grey,
displaying each symbol that is a lowercase letter in the color blue, and
displaying each symbol that is an uppercase letter in the color red.

11. A method as in claim 8 wherein the predefined group of alphanumeric digits includes at least 70 digits.

12. A method as in claim 11 wherein rendering includes presenting the series of alphanumeric digits on an electronic display of a mobile device.

13. A method as in claim 12 wherein the mobile device is a smart phone, and the electronic display is a touchscreen of the smart phone.

14. A method as in claim 13 wherein receiving the request for the security code includes:
detecting a button press event in response to a user gesture entered on the touchscreen.

15. A method as in claim 14 wherein choosing the at least six alphanumeric digits includes:
selecting, as the security code, a current password that matches an expected password maintained by an authentication server, the authentication server comparing a user-provided password to the expected password that matches the current password to control user access to a computerized protected resource.

16. A method as in claim 14 wherein receiving the request for the security code further includes:
after detecting the button press event in response to the user gesture entered on the touchscreen, performing an authentication operation to authenticate a user that entered the user gesture, the security code being generated in response to successful authentication of the user.

17. Electronic apparatus, comprising:
a display screen;
memory; and
control circuitry coupled to the display screen and the memory, the memory storing instructions which, when carried out by the control circuitry, cause the control circuitry to:
receive a request for a security code,
automatically generate a security code in response to the request, the security code including a series of alphanumeric digits which contains at least one number and at least one letter, wherein the security code is generated at least in part by the control circuitry automatically choosing at least six alphanumeric digits from a predefined group of alphanumeric digits without user input subsequent to receipt of the request for the security code,
in response to and after generation of the security code by the control circuitry and without user input subsequent to the receipt of the request for the security code, automatically display the security code on the display screen, wherein the series of alphanumeric digits in the security code is automatically displayed by the control circuitry using a combination of different visual characteristics automatically selected by the control circuitry to visually distinguish numbers of the security code from letters of the security code, each number being displayed on the display screen using a first visual characteristic that is automatically selected by the control circuitry, and each letter being displayed on the display screen using, instead of the first visual characteristic, at least one visual characteristic that is different from the first visual characteristic and that is also automatically selected by the control circuitry, and wherein the instructions, when carried out by the control circuitry, further cause the control circuitry to automatically display the security code by the control circuitry in response to and after automatic generation of the security code by the control circuitry and without user input subsequent to receipt of the request for the security code at least in part by causing the control circuitry to i) automatically parse the previously generated security code by the control circuitry with regard to each individual alphanumeric digit in the security code, and ii) automatically select, by the control circuitry after parsing of the previously generated security code by the control circuitry, the first visual characteristic for each individual number in the security code and the at least one visual characteristic that is different from the first visual characteristic for each individual letter in the security code, and
while the security code is displayed on the display screen, simultaneously display a legend adjacent to the security code, the legend visually indicating that the individual numbers of the security code are displayed using the first visual characteristic and that the individual letters of the security code are displayed using the at least one visual characteristic that is different from the first visual characteristic.

18. Electronic apparatus as in claim 17 wherein the control circuitry, when displaying the security code on the display screen, is constructed and arranged to:
output each number in a first typeset and each letter in a typeset that is different from the first typeset.

19. Electronic apparatus as in claim 17 wherein the control circuitry, when displaying the security code on the display screen, is constructed and arranged to:
output each number in a first color and each letter in a color that is different from the first color.

20. Electronic apparatus as in claim 19 wherein the series of alphanumeric digits includes at least one number, at least one lowercase letter, and at least one uppercase letter;
wherein the control circuitry, when outputting, is constructed and arranged to render each number in the first color, each lowercase letter in a second color, and each uppercase letter in a third color; and
wherein the first color, the second color, and the third color are different from each other.

21. Electronic apparatus as in claim 20 wherein the control circuitry, when receiving the request for the security code, is constructed and arranged to:
detect a button press event in response to a user gesture entered on a touchscreen which operates as the display screen, and
after detecting the button press event, perform an authentication operation to authenticate a user that entered the user gesture, the security code being generated in response to successful authentication of the user.

22. Electronic apparatus as in claim 21 wherein the control circuitry is further constructed and arranged to:
display the legend such that the legend further indicates that the numbers are rendered in the first color, lowercase letters are rendered in the second color, and uppercase letters are rendered in the third color.

23. A computer program product having a non-transitory computer readable medium which stores a set of instructions to display a security code on an electronic apparatus, the set of instructions, when carried out by computerized circuitry of the electronic apparatus, causing the computerized circuitry to perform a method of:
receiving a request for a security code;
automatically generating a security code in response to the request, the security code including a series of alphanumeric digits which contains at least one number and at least one letter, wherein generating the security code includes automatically choosing, by the computerized circuitry without user input subsequent to receipt of the request for the security code, at least six alphanumeric digits from a predefined group of alphanumeric digits;
in response to and after automatic generation of the security code by the computerized circuitry and without user input subsequent to receipt of the request for the security code, automatically displaying the security code on a display screen, wherein the series of alphanumeric digits in the security code is automatically displayed by the computerized circuitry using a combination of different visual characteristics automatically selected by the computerized circuitry to visually distinguish numbers of the security code from letters of the security code, each number being displayed on the display screen using a first visual characteristic that is automatically selected by the computerized circuitry, and each letter displayed on the display screen using, instead of the first visual characteristic, at least one visual characteristic that is different from the first visual characteristic and that is also automatically selected by the computerized circuitry, and wherein automatically displaying the security code by the control circuitry in response to and after automatic generation of the security code by the control circuitry and without user input subsequent to receipt of the request for the security code further comprises i) automatically parsing the previously generated security code by the control circuitry with regard to each individual alphanumeric digit in the security code, and ii) automatically selecting, by the control circuitry after parsing of the previously generated security code by the control circuitry, the first visual characteristic for each individual number in the security code and the at least one visual characteristic that is different from the first visual characteristic for each individual letter in the security code; and while the security code is displayed on the display screen, simultaneously displaying a legend adjacent to the security code, the legend visually indicating that the individual numbers of the security code are displayed using the first visual characteristic and that the individual letters of the security code are displayed using the at least one visual characteristic that is different from the first visual characteristic.

\* \* \* \* \*